United States Patent [19]
Alekseev et al.

[11] Patent Number: 5,817,025
[45] Date of Patent: Oct. 6, 1998

[54] METHOD FOR DIAGNOSING MALIGNANCY DISEASES

[76] Inventors: Sergei Grigorevich Alekseev, kv.459, korp.2, d.12, ul. Isakovskogo, Moscow, 123181; Nikolai Borisovich Brandt, kv.26, korp.L, MGU, Leninskie gory, Moscow, 117234; Galina Aleksandrovna Mironova, kv.26, korp.L, MGU, Leninskie gory, Moscow, 1103885, all of Russian Federation; Hiroshi Akimoto; Keiko Akimoto, both of 26 Kitayacho, Nakahara-ku, Kawasaki-shi, Kanagawa-ken, Japan, 211

[21] Appl. No.: 864,239

[22] Filed: May 28, 1997

[30] Foreign Application Priority Data

Sep. 30, 1996 [RU] Russian Federation ............. 96119529

[51] Int. Cl.$^6$ ...................................................... A61B 6/00
[52] U.S. Cl. ............................. 600/477; 356/39; 356/339
[58] Field of Search ..................................... 600/310, 322, 600/473, 475, 476, 477; 356/39, 337–339; 436/64, 63; 250/573–576

[56] References Cited

PUBLICATIONS

Actual Issues of Modern Oncology, by Tomsk, 1994, Russian document w/English translation.

*Primary Examiner*—Ruth S. Smith
*Attorney, Agent, or Firm*—David L. Garrison; Matthew J. Marquardt

[57] ABSTRACT

The method for diagnosing malignancy diseases involving analysis of blood plasma by laser correlational spectroscopy (LSC) techniques includes the steps of: preparing a weak diluted solution of native blood plasma, determining a spectral density of light scattering intensity fluctuations within the frequency range between 1 and 1000 Hz, distinguishing a spectrum core and making a diagnosis from a frequency of a maximum and an intensity-to-half-width ratio of a spectrum core envelope, a malignancy disease being detected when the diagnostic parameters are less than the appropriate rates. The apparatus for diagnosing malignancy diseases includes a nephelometer and a series-connected correlation spectrum analyzer. The nephelometer further includes a second scattered light detector disposed symmetrically about a first scattered light detector, a signal multiplier whose inputs are coupled to outputs of the first and second scattered light detectors, a low pass filter whose input is coupled to an output of the signal multiplier, and an output is coupled to a correlator of the spectrum analyzer, a conventional ampoule for a solvent being used as a measuring cuvette in the nephelometer.

1 Claim, 3 Drawing Sheets

METHOD FOR DIAGNOSING MALIGNANCY DISEASES

FIELD OF THE INVENTION

The present invention generally relates to medicine, and more particularly, to methods and apparatuses for diagnosing malignancy diseases on the basis of analysis of human blood plasma, and can be used in screening for detecting malignancy diseases in the public health field.

DESCRIPTION OF THE PRIOR ART

Methods for analysis of blood plasma involving usage of laser light sources for acting on the material being analyzed are known in the art. The scattered light data obtained thereby are then used for detection of malignancy diseases.

Particularly, Gordienko et al., *Verification of Tumors by Laser Fluorescence Spectroscopy*, Materials of the VIII Ukraine Congress of Oncologists, Donetsk, 1990, pages 183–184, detected malignancy using a selective accumulation of fluorochrome in tumors and a subsequent application of laser fluorescence spectroscopy means.

The laser spectroscopy means are also known to be used for detecting chronic pretumor and tumor pathologies, wherein a tissue section, placed in a measuring cell of a laser spectrometer, is analyzed by laser spectroscopy (*Collected Book of Actual Issues of Modern Oncology*, Tomsk, 1994, pages 37–38).

Merlich K. I. et al., *Substractional Structure of Blood Plasma in Patients with Beginning Tumors and Mammary Cancer According to Laser Correlational Spectroscopy* (LSC) proved experimentally (on the mammary cancer cases) that a method of dynamic light scattering from the analyzed blood plasma solution can be, in principle, used for detection of malignancy. It was further noted, that in cancer patients the particle size distribution was shifted towards the region of smaller particles having the size of the order of 10–12 nm, as compared to non-cancer patients.

In the physical sense, the prior art above was described by Lebedev A. D. et al., *Laser Correlational Spectroscopy in Biology*, Kiev, 1987.

Assuming the simplest solution containing optically isotropic identical particles which are small in comparison to a wavelength of incident light, an autocorrelation function and a spectral density of a dynamic light scattering signal can be presented as $$G(\tau)=Ae^{-\Gamma(\tau)} \quad (1)$$

$$S(\omega)=[A\Gamma^2/\pi]/[(\omega_0-qV)^2-\Gamma^2] \quad (2)$$

where $\Gamma=D_t q^2$ is a diffusion broadening, $D_t$ is a translational diffusion ratio, $\tau$ is a correlation radius, $q=4\pi(n_0/\lambda)\sin(\Theta/2)$ is a wave vector, $n_o$ is a refractive index of a solvent, $\lambda$ is an incident light wavelength, and $\omega_0$ is its respective frequency, $\Theta/2$ is an observation angle with scattered light, equal to 90°, qV is a Doppler shift of an incident light wavelength on particles moving in the course of translational diffusion, and A is an amplitude (intensity) of light scattering fluctuations, corresponding to a diffusion broadening, $\Gamma$.

A translational diffusion ratio $D_t$ is related to a hydrodynamic radius $R_h$ of scattering particles by the Stokes-Einstein relation:

$$\Gamma=[KT]/[6\pi\xi R_h] \quad (3)$$

where K is a Boltzmann constant,

T is an absolute temperature, and $\xi$ is a solution viscosity.

Based on that, a macromolecule size distribution in a blood plasma being analyzed is estimated in accordance with the relation $$N(R_h)=[A\Gamma(R_h)]/[R_h^{(2m+2)}] \quad (4)$$

where $N(R_h)$ is a number of molecules having a hydrodynamic radius $R_h$, $A\Gamma(R_h)$ is an amplitude (intensity) of dynamic light scattering fluctuations, corresponding to the diffusion broadening $\Gamma(R_h)$, m is a parameter accounting for a form factor of the solution scattering molecules: m=3 for <<globular particles>>, m=2 for <<spheres and Gaussian ball>>.

The prior art method above and an apparatus used for its implementation provide a possibility to analyze blood plasma using a dynamic light scattering, and to define peculiarities of size distribution of blood plasma particles. Mathematical processing of the results on the basis of regularization methods permits a recovery of the original molecular weight ratio of the constituents of the blood plasma system in the range between 1 and $10^4$ nm.

An essential problem with the prior art method is that it is correct only for the Brownian model of diffusion processes, wherein a translational diffusion ratio is defined by a thermal energy KT, ignoring a sufficiently strong electrostatic interaction between surface-charged protein macromolecules, the energy of which interaction can be many times greater than the thermal energy KT. The electrostatic interaction between macromolecules affects the dynamics of their Brownian movement in the solution, shifting an estimate of the diffusion broadening $\Gamma$, which in turn leads to the $R_h$ estimate error (see expression (3)) and, as a consequence, to errors in definition of a spectral density of a dynamic light scattering signal.

Another problem of the prior art method is its low accuracy due to the fact that the source material samples are specially treated before the analysis. Blood plasma is frozen and subjected to double centrifugation (at 1500 g) causing alterations in the physical parameters of blood plasma protein.

Apart from that, the measurement accuracy of the prior art apparatus is adversely affected by a low desired signal-to-in-channel noise ratio.

It is an object of the present invention to provide a method for diagnosing malignancy diseases based on laser correlational spectroscopy techniques, ensuring a high degree of automation of the measurement process, quickness and a possibility of using, for diagnosis, the same biological material as used in the biochemical blood analysis.

SUMMARY OF THE INVENTION

The present invention is directed to a method and apparatus for diagnosing malignancy diseases on the basis of analysis of human blood plasma molecular parameters, utilizing laser correlational spectroscopy techniques.

A method for diagnosing malignancy diseases according to the present invention includes the steps of:

(a) preparing a blood plasma solution and placing said blood plasma solution in a measuring cuvette;

(b) generating a primary laser beam and directing said primary laser beam to said measuring cuvette;

(c) recording spectra of light scattering intensity fluctuations in the frequency shift range between 1 Hz and 1000 Hz as output signals of a pair of light detecting means disposed symmetrically about the measuring cuvette and at an angle 90° with respect to the direction of the primary laser beam;

(d) processing said signals in a two-channel correlation detector to define an autocorrelation function of the light scattering intensity fluctuations;

(e) determining a spectral density of a light scattering intensity by processing said autocorrelation function of the light scattering intensity fluctuations in a Fourier transformer;

(f) calculating a spectrum core of said spectral density of the light scattering intensity and determining an envelope of the spectrum core;

(g) defining values of a frequency of a maximum, an intensity and a half-width of said spectrum core envelope;

(h) defining a value of intensity-to-half-width ratio;

(i) comparing the values of said frequency of the envelope maximum and said intensity-to-half-width ratio to respective values for a verified reference group of practically healthy individuals; and (j) diagnostically detecting malignancy when said values of the frequency of the envelope maximum and the intensity-to-half-width ratio are less than the respective values for a verified reference group of practically healthy individuals.

In another aspect, the invention features an apparatus for diagnosing malignancy diseases.

An apparatus for diagnosing malignancy diseases according to the present invention includes a laser light source, a cuvette for holding a blood plasma solution, said cuvette being disposed along an axis of a primary laser beam, a first light detecting means, a second light detecting means disposed with said first light detecting means symmetrically about said cuvette for holding the blood plasma solution and at an angle 90° with respect to a direction of a primary laser beam, a correlator, a Fourier transformer and a microprocessor, all connected in series, a signal multiplier and a low pass filter, wherein an output of the first light detecting means is coupled to an input of said correlator through a first input of said signal multiplier and said low pass filter, the signal multiplier and the low pass filter being connected in series, and an output of said second light detecting means is coupled to the input of the correlator through a second input of the signal multiplier and the low pass filter, said microprocessor being adapted for determining a spectral density of scattered light intensity fluctuations from spectral characteristics obtained upon Fourier transformation in the frequency range between 1 and 1000 Hz.

BRIEF DESCRIPTION OF THE DRAWINGS

The advantages of this invention will become more readily apparent as the same becomes more better understood by reference to the following detailed description when taken in conjunction with the accompanying drawings wherein.

DETAILED DESCRIPTION OF THE INVENTION

Figure 1:
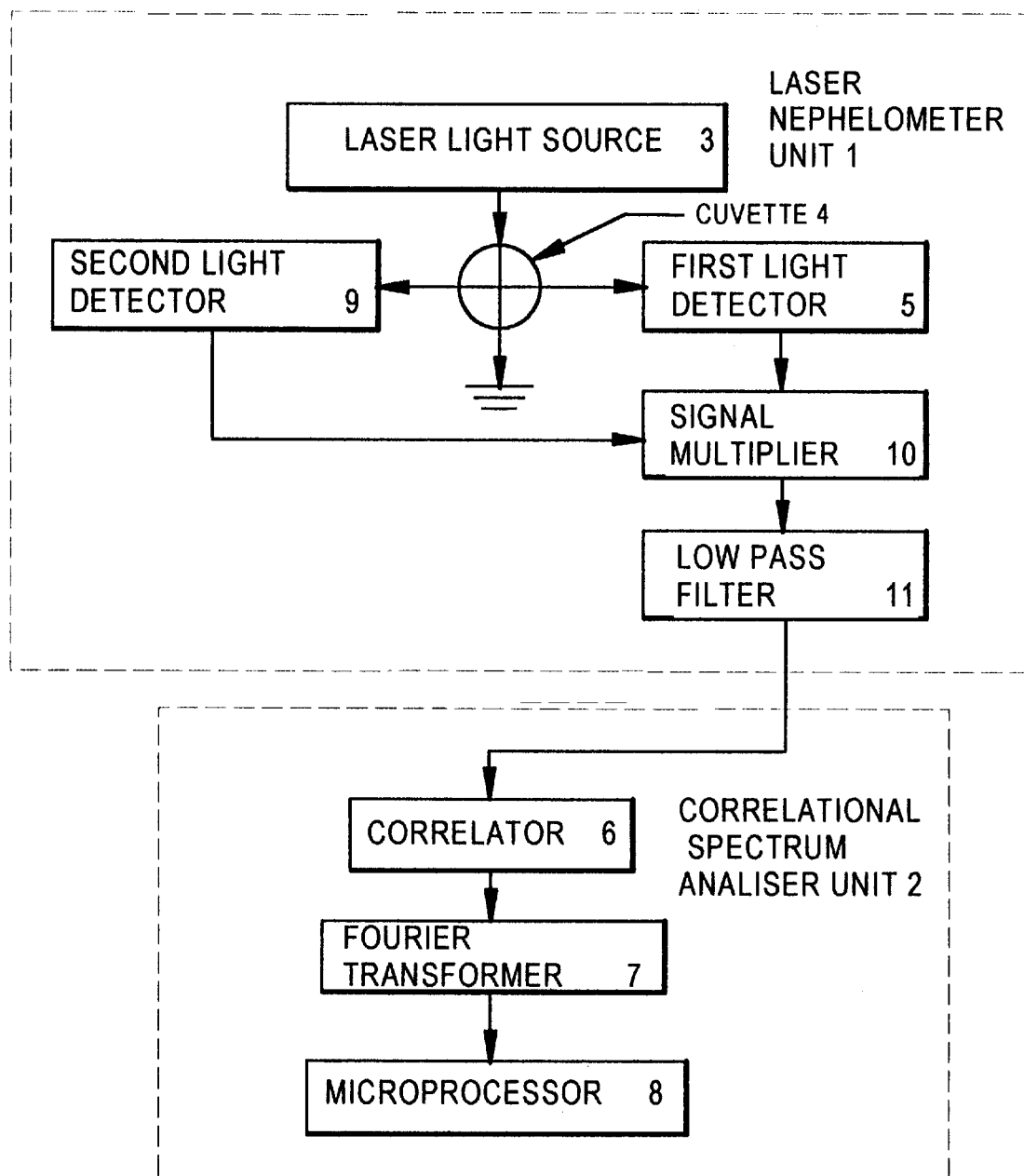
FIG. 1 is a schematic functional diagram of an apparatus for analyzing blood plasma.

To determine intrinsic molecular parameters of blood plasma, the method according to the present invention involves dynamic light scattering from diluted native plasma solutions prepared by a conventional technology used in the biochemical blood analysis.

The present invention is based on a theoretically and experimentally supported fact that an average spectral density of light scattering intensity fluctuations from a solution being tested permits distinguishing an intrinsic spectrum core which can be specified by the following characteristics: a frequency of an envelope maximum, an intensity of a center of gravity and a half-width of the spectrum core. Therewith, the cancer patients have lower frequency of the envelope maximum and intensity and greater half-width as compared to the values of the respective parameters from cancer-free patients and practically healthy individuals.

This is explained by the following factors.

In formation of blood cell composition, various organs and systems of a human organism are involved, such as liver, marrow, lymph nodes, spleen, etc. Commonly known is the fact that blood consists of 55 wt. % of plasma and 45 wt. % of hemocytes, i.e. erythrocytes, leukocytes and blood platelets suspended in plasma. Blood plasma contains macromolecules of albumin, globulin and fibrinogen.

In a healthy organism, the blood cell composition and hemopoietic organs constitute a balanced biological system in which a continuous autoregulated renewal of aged blood cells takes place.

Any changes in the organism induce disturbance of this balance, immediately effecting the hematological status. Various diseases, toxins, carcinogenic substances, ionizing radiation, inflammatory processes, etc., cause a disturbance of hemogenesis and a synthesis of structurally changed, immature hemocytes. This leads to alterations in the blood composition and the molecular parameters of proteins included therein, which alterations can be, in principle, used for diagnostic purposes. Therefore, when developing diagnostic methods for various diseases, the basic problem is to determine the blood parameters which would most probably ensure discrimination of a normal individual and a patient suffering from a particular disease from each other. In this connection, of interest are specific changes occurring directly in blood plasma macromolecules at the early stages of malignancy diseases.

The carcinogenesis being in progress, blood plasma (serum) experiences both quantitative and qualitative changes which are practically independent of the disease type.

Firstly, absolute and relative concentration values of albumin and globulin molecules change. While in a normal individual the concentration of albumin molecules is three-four times greater than that of globulin molecules, at carcinogenesis the concentration ratio decreases and then reverses, i.e. in cancer patients the concentration of globulin molecules becomes much higher than that of the albumin molecules. It should be also noted that at the advanced stages of carcinogenesis the absolute concentration values of albumin and globulin macromolecule in blood plasma are being reduced.

Secondly, a magnitude and a surface charge distribution in albumin molecules are quantitatively varying. Albumin molecules have a spindle-shaped structure with a length of (80–100) A and a middle portion diameter over (15–20) A, possess a considerable electric dipole moment which can reach hundreds of debyes, and a negative charge disposed at the surface layer. The surface charge is induced by unfilled chemical bonds and a strong affinity to electron at surface atomic complexes.

At carcinogenesis, the charge is being reduced, from one hand, due to a synthesis (apparently, by liver) and appearance, in blood, of positively-charged specific inhibitors adding to the albumin molecule, and, from the other hand, due to alterations in the chemical composition of surface atomic complexes.

Variations in surface charge distribution in albumin macromolecules substantially change the nature of their interaction in a blood plasma (serum) solution. Therewith, the dominant repulsive forces (inherent for blood plasma status in cancer-free patients) are progressively transformed to the attractive forces (inherent for blood plasma status in cancer patients). This leads to coagulation of albumin molecules accompanied by formation of various three dimensional patterns having an essentially greater molecular weight.

Thirdly, at carcinogenesis, many cell membranes are being oxidized which, in turn, induces a modification of lipoprotein physical properties and a reduction of the protective response of immune system.

Fourthly, at carcinogenesis, paraproteins and various albumin fractions, having different molecular weights and charge properties, appear in blood plasma. In addition, cystine disulfide bonds in immunoglobulin molecules are disintegrated thereby causing a destruction of intrachain bonds, and a tertiary structure is being denaturalized with changing into the primary one. Presence of Ig molecule fragments is an exact marker of a malignant process.

Fifthly, the carcinogenesis progress is frequently accompanied by a disturbance of the water-electrolyte exchange due to decomposition of tumor mass and release of intracellular elements (potassium, magnesium, phosphorous, sulphur) to the extracellular space and their loss with urine, and can also involve shifts in the acid-alkaline state.

By virtue of the fact that similar changes can occur in blood plasma even at common diseases, especially at those having a close etiology, for example, at acute hepatic toxicosis, it is desired to establish to which extent these changes are specific for malignancy diseases.

The difference is as follows. At non-malignancy diseases, blood plasma alters only within certain limits. Actually, while a non-malignancy disease is in progress, the function of hemopoietic organs is being disturbed and the blood plasma composition changes, however, immune protective mechanisms concurrently come into effect (antibodies are intensively synthesized, enzyme systems are stimulated, virus inhibitors reproduction is enhanced, etc.) suppressing further progress of the disease and restricting the alterations in the blood parameters. Consequently, the organism immune systems efficiently destroy malignant cells appearing by various reasons.

At malignancy diseases, malignant cells synthesize antigens having an extremely low immunogenicity. Therefore, the malignant antigens fail to provide the so desired immune protective response. In this connection, the unrestricted growth of a number of malignant cells results in a continuous increase of toxin concentration in the organism, and as the result, the changes in blood, described above, continuously grow and can many times exceed the extreme values of this changes specific for non-malignancy diseases. Malignancy most probably appears at the stage of a substantial and sufficiently prolonged anomaly in functioning immune systems and other human organs, i.e. when alterations in blood parameters reach a definite critical level.

It suggests that the blood plasma parameters can be separated into three adjacent regions defining practically healthy individuals, patients suffering from non-malignancy diseases and cancer patients. When alterations in blood plasma parameters approach the extreme values separating the patients suffering from common diseases from the cancer patients (a zone of risk), the patient being examined is at risk for advancing a malignancy disease. In this case, it is necessary to define the dynamics of these alterations with time, i.e. whether the blood plasma parameters are being shifted towards the cancer patients, or, on the contrary, they are being normalized proving a non-malignancy nature of the disease.

Alterations in the blood plasma molecular parameters, discussed above, essentially affect the Brownian dynamics nature of diffusion processes observed in the tested blood plasma solutions, wherein an energy dissipation by diffusion processes is defined by the dipole-dipole and dipole-charge intermolecular interactions whose energy can be many times greater than the thermal energy KT. In this case, a mechanism known as a dielectric friction mechanism is realized.

In this connection, the following characteristics can be used as diagnostic indexes: a frequency of the maximum (maxF) and an intensity (I)-to-half-width (dF) ratio of the spectrum core envelope in a light scattering signal from the blood plasma solution being tested, that reflect a specific nature of the light scattering dynamics, numeric values of which, as established by the inventors, are less for cancer patients than for cancer-free patients and practically healthy individuals.

An apparatus for implementing the method in accordance with the present invention is intended for defining light scattering characteristics followed by processing the results and distinguishing a frequency of maximum (maxF) and an intensity (I)-to-half-width (dF) ratio of the spectrum core envelope of the light scattering signal. Therein, the studies revealed that the obtained signal of the light scattering intensity fluctuations should undergo a narrow band spectrum treatment in the frequency range between 1 and 1000 Hz.

A method for diagnosing malignancy diseases in accordance with the present invention is implemented using the inventive apparatus.

A blood plasma solution is prepared from venous blood collected from the subjects being examined in the morning hours after an overnight fast. The prepared blood plasma solution is placed in a measuring cuvette. A primary laser beam is generated and directed to the measuring cuvette.

Light, scattered from the tested blood plasma solution, simultaneously strikes inputs of a first photodetector 5 and a second photodetector 9 wherein the light is converted to analog signals applied to a first and second inputs of a signal multiplier 10. The signal multiplier 10, in conjunction with a series connected low pass filter 11, form a two-channel correlation detector. Presence of two high frequency channels, having the same desired signal and non-correlated in-channel noises, ensures an improvement in a detected signal/noise ratio no less than 1.4 times as compared to a quadratic detector. When detected, the signal with the improved signal/noise ratio is applied to an input of a correlator 6 for calculating an autocorrelation function of light scattering intensity fluctuations induced by temporal variation of optical density in a scattering volume specified by a beam from a laser light source 3 in the cuvette 4 holding the blood plasma. From an output of the correlator 6, the autocorrelation function reflecting the temporal nature of the molecule motion dynamics in the solution being tested, is coupled to a Fourier transformer 7 where a spectral density of light scattering dynamics is defined. From an output of the Fourier transformer, the spectral density data are coupled to a microprocessor 8 for distinguishing a spectrum core and defining its intrinsic parameters, such as a frequency position of its maximum, an intensity and a half- width. The light scattering intensity fluctuations signal undergoes a narrow band spectrum treatment in the frequency range between 1 and 1000 Hz. This frequency region is the most informative one in the analysis of biological objects by laser correlational spectroscopy techniques.

For the distinguished spectrum core, the following numeric values are estimated: a frequency position of its envelope maximum, maxF, and the intensity-to-half-width ratio, I/dF.

When the diagnostic indexes lye beyond the values of the appropriate representative rates, [Rate1/maxF]>1 and [Rate2/(I/dF)]>1, from a verified reference group of practically healthy individuals, malignancy is diagnostically detected.

The rates above are further referred to as a first and second diagnostic indexes, respectively.

Unlike the conventional structures of laser nephelometers, the apparatus according to the present invention includes two (rather than a single one) light detectors disposed symmetrically about the original laser beam, providing a considerably improved signal/noise ratio and consequently enhanced accuracy in estimating the diagnostic indexes, while a conventional ampoule for a solvent is used as a nephelometer measuring cuvette.

In the preferred embodiment of implementing a diagnostic method in accordance with the present invention, as described above, scattered light was excited with a TE-mode neonhelium laser (LG-38 Model) at ~40 mW power of output radiation. A primary laser beam was focused by a lens at a center of a measuring cuvette containing a blood plasma solution.

The scattered light was sensed by light detecting means such as photomultipliers positioned as required around the cuvette to an accuracy of ±30 seconds. The photomultipliers were of FEY-79 Model. A dark current of the phototmultiplies was at the level of $10^{-9}$ A, the supply voltage being 1880 V.

The two-channel correlation detector, Fourier transformer and computer were conventional means known to those skilled in the art.

Example 1 (a cancer-free patient). A 69-yr-old female with a preliminary diagnosis of cervical cancer. The thoracic organs X-ray within the age rate. Renography with hippuran without pathology. Biochemical blood analysis, clinical blood and urine analyses without pathology. Performed a selective scraping of uterus. Cytological conclusion—a cervical polyp, endometrial hyperplasia. Final diagnosis—endometrial hyperplasia. The first and second diagnostic indexes obtained by the biophysical analysis in accordance with the present invention were 0.69 and 0.61, respectively.

Example 2 (a cancer-free patient). A 48-yr-old female with the preliminary diagnosis of a right mammary gland cancer. The thoracic organs X-ray without pathology. Mammagraphy revealed a cystus in a right mammary gland. Clinical blood and urine analyses without pathology. Cytograms without atypical features. Performed a sectoral resection of the right mammary gland. Gystological conclusion—fibrocystic mastopathy. The first and second diagnostic indexes obtained by the biophysical analysis in accordance with the present invention were 0.51 and 0.55, respectively.

Example 3 (a cancer patient). A 56-yr-old male with the preliminary diagnosis of a tongue cancer, III stage. Pathologically—a dermoid cancer. The thoracic organs X-ray and clinical blood and urine analyses without pathology. Hepatoscintillography did not reveal hepatic diffused injuries. Neck ultrasonic study did not reveal lymph gland metastasis, a node being detected in a lower pole of thyroid right lobe. Scanning revealed neither thyroid hyperfixation, nor a cold zone. Performed a combined ray therapy of the primary source which resulted in a direct recovery. Currently, a ray therapy of the regional lymph outflow zones is going to an end. Before the treatment, the patient was examined by the biophysical analysis in accordance with the present invention. The first and second diagnostic indexes were 1.51 and 2.49, respectively.

Table 1 lists values of the first and second diagnostic indexes obtained in the course of preliminary clinical studies of the claimed diagnostic method for cancer patients (before therapy) and for practically healthy individuals and cancer-free patients examined by this method.

TABLE 1

Cancer Patients

Values of diagnostic indexes

| No. | I | II | Diagnosis |
|---|---|---|---|
| 1 | 1.37 | 1.41 | mammary cancer |
| 2 | 1.23 | 1.76 | mammary cancer |
| 3 | 1.59 | 2.03 | acute leukosis |
| 4 | 1.38 | 3.15 | thyroid cancer |
| 5 | 0.96 | 1.33 | thyroid cancer |
| 6 | 1.14 | 2.16 | thyroid cancer |
| 7 | 1.84 | 3.97 | cervical cancer |
| 8 | 1.51 | 2.49 | tongue cancer |
| 9 | 1.17 | 1.55 | uterus cancer |
| 10 | 1.22 | 4.35 | acute leukosis |
| 11 | 1.37 | 2.14 | larynx cancer |
| 12 | 1.46 | 2.93 | hepatic cancer |
| 13 | 1.87 | 3.01 | kidney cancer |
| 14 | 1.47 | 1.05 | lymphogranulomatosis |
| 15 | 0.98 | 1.27 | lymphogranulomatosis |
| 16 | 1.96 | 2.19 | thyroid cancer |
| 17 | 1.12 | 1.11 | cervix cancer |
| 18 | 1.61 | 1.91 | gastric cancer |
| 19 | 1.17 | 3.49 | lymphosarcoma |
| 20 | 1.78 | 2.87 | nasopharyngeal cancer |

Mean values of the first and second diagnostic indexes are 1.41 and 2.31, respectively.

Cancer-free patients and healthy individuals

Values of diagnostic indexes

| No. | I | II | Diagnosis |
|---|---|---|---|
| 1 | 0.71 | 0.89 | hepatitis |
| 2 | 0.61 | 0.59 | cholecystitis |
| 3 | 0.79 | 0.74 | toxic goiter |
| 4 | 0.61 | 0.61 | pyelonephritis |
| 5 | 0.61 | 0.61 | endometrial hyperplasia |
| 6 | 0.51 | 0.55 | fibrocystic mastopathy |
| 7 | 0.31 | 0.29 | healthy subject |
| 8 | 0.44 | 0.51 | healthy subject |
| 9 | 0.41 | 0.24 | healthy subject |
| 10 | 0.42 | 0.29 | healthy subject (donor) |
| 11 | 0.65 | 0.63 | healthy subject |
| 12 | 0.64 | 0.54 | healthy subject |
| 13 | 0.79 | 0.65 | healthy subject |
| 14 | 0.51 | 0.39 | healthy subject |
| 15 | 0.62 | 0.53 | healthy subject |
| 16 | 0.51 | 0.55 | healthy subject |
| 17 | 0.39 | 0.28 | healthy subject |
| 18 | 0.41 | 0.31 | healthy subject |
| 19 | 0.42 | 0.26 | healthy subject |
| 20 | 0.41 | 0.23 | healthy subject |

Mean values of the first and second diagnostic indexes are 0.54 and 0.43, respectively.

Figure 2:
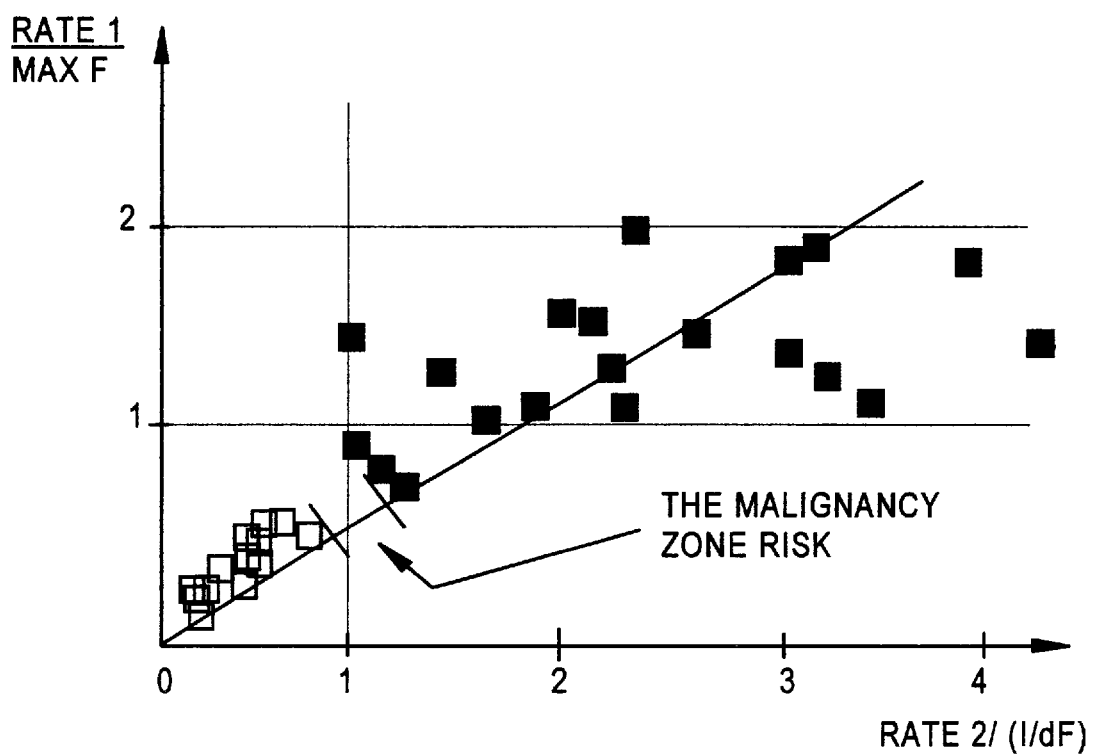
FIG. 2 represents values of a first and second diagnostic indexes, Rate/maxF and Rate/dF, where the appropriate Rate values are defined from a verified reference group of practically healthy individuals.

Experimental data listed in Table 1 are depicted in a form of a two-dimensional plot in FIG. 2. From FIG. 2, it is readily seen that the examined patients are separated into two groups: the cancer patients (before the therapy) and the cancer-free patients and practically healthy individuals.

The diagnostic indexes from cancer patients tested in the course of efficient therapy may fall into an intermediate region and even pass into the region of cancer-free patients and healthy individuals.

The diagnostic indexes from cancer-free patients suffering from acute stages of diseases may fall into an intermediate region and, at a sufficiently efficient therapy, come back to the region specific for practically healthy individuals.

As the numeric values and maxF and I/dF are concurrently less for cancer patients than for cancer-free patients and practically healthy individuals, the diagnostic process can be simplified by application of a sole general diagnostic criterion, such as a complex criterion (krG), jointly relating all the diagnostic criteria discussed above, i.e. maxF, I and dF:

$$krG = M*[(maxF)*(I/dF)],$$

where M is a suitable scale factor.

Figure 3:
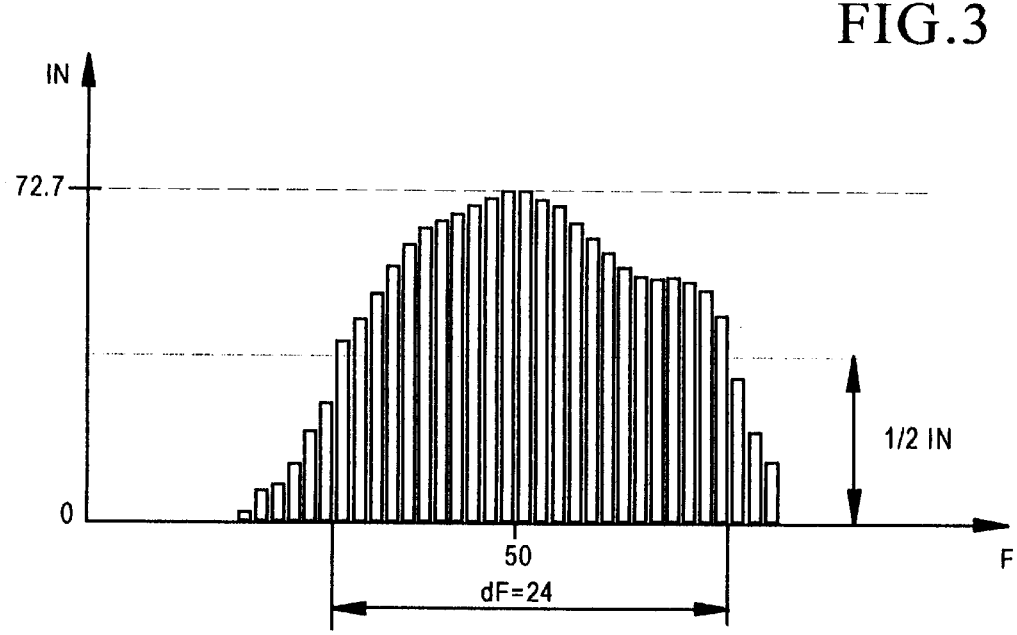
FIG. 3 shows a computer diagnostic map of a cancer patient examined by the method in accordance with the present invention.
Figure 4:
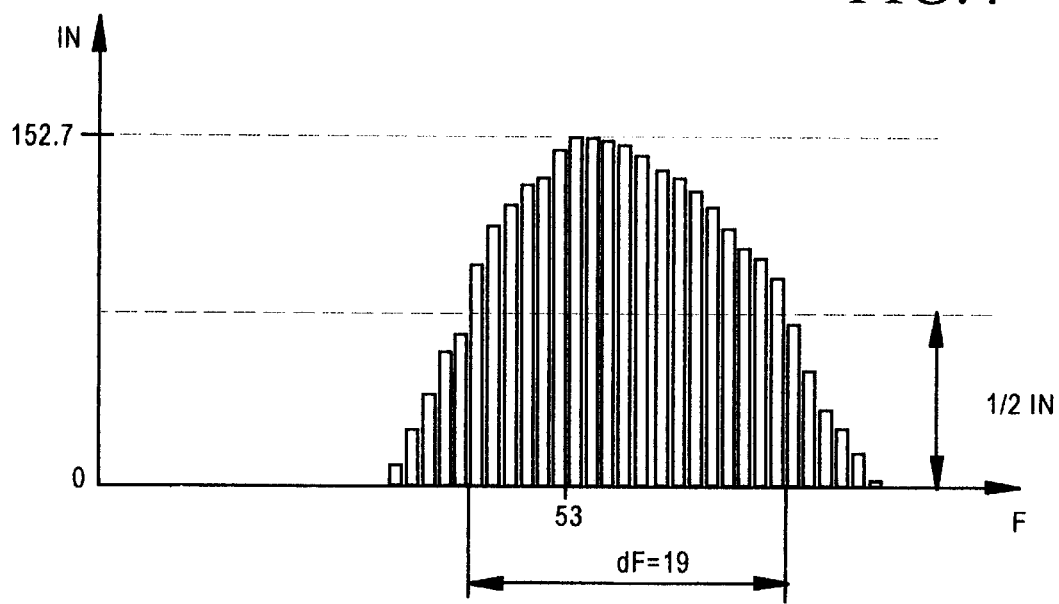
FIG. 4 shows a computer diagnostic map of a practically healthy individual examined by the method in accordance with the present invention.

In this case, the criterion above (being a three dimensional one) allows a clearly evident discrimination of groups of patients and practically healthy individuals from each other. Consequently, a comparison of only the general criterion above to the Rate is sufficient. The comparison to the Rate can be made by the [Rate/krG] or [krG/Rate] rule. FIGS. 3 and 4 represent examples of computer diagnostic maps of a cancer subject and a practically healthy individual, respectively, examined by the claimed method, the diagnosis being made by the [krG/Rate] rule.

Repeated testing of a patient improves the diagnostic efficiency in accordance with the expression:

$$P_{sd} = [1-(1-P_{md})^{n1}] \quad (5)$$

where $P_{sd}$ is an efficiency of a single diagnosis of a patient (n=1);

$P_{md}$ is an efficiency of repeated diagnoses of a patient (n>1);

n is a number of diagnoses of a patient, repeated at an interval of 10 to 15 days.

It will be appreciated that although only the preferred embodiments of the present invention have been described above, further changes and modifications can be made therein, including application of equivalent means, units and steps, within the scope of the invention as defined by the claims appended thereto.

What is claimed is:

1. A method for diagnosing malignancy diseases comprising the steps of:

(a) preparing a blood plasma solution and placing said blood plasma solution in a measuring cuvette;

(b) generating a primary laser beam and directing said primary laser beam to said measuring cuvette;

(c) recording spectra of light scattering intensity fluctuations in the frequency shift range between 1 Hz and 1000 Hz as output signals of a pair of light detecting means disposed symmetrically about the measuring cuvette and at an angle 90° with respect to the direction of the primary laser beam;

(d) processing said signals in a two-channel correlational detector to define an autocorrelation function of the light scattering intensity fluctuations;

(e) determining a spectral density of a light scattering intensity by processing said autocorrelation function of the light scattering intensity fluctuations in a Fourier transformer;

(f) calculating a spectrum core of said spectral density of the light scattering intensity and determining an envelope of the spectrum core;

(g) defining values of a frequency of a maximum, an intensity and a half-width of said spectrum core envelope;

(h) defining a value of intensity-to-half-width ratio;

(i) comparing the values of said frequency of the envelope maximum and said intensity-to-half-width ratio to respective values for a verified reference group of practically healthy individuals; and (j) diagnostically detecting malignancy when said values of the frequency of the envelope maximum and the intensity-to-half-width ratio are less than the respective values for a verified reference group of practically healthy individuals.

* * * * *